United States Patent [19]

Farmer et al.

[11] Patent Number: 5,184,975
[45] Date of Patent: Feb. 9, 1993

[54] SEROSA PEELING MACHINE

[75] Inventors: Leonard E. Farmer, Gladesville; Jeffrey B. Stewart, Gymea; Ralph Turner, Arncliffe, all of Australia

[73] Assignee: American Cyanamid Company, Stamford, Conn.

[21] Appl. No.: 703,949

[22] Filed: May 22, 1991

[51] Int. Cl.[5] .................................................. A22C 17/16
[52] U.S. Cl. ........................................ 452/198; 452/123
[58] Field of Search ............................ 452/198, 172, 123

[56] References Cited

U.S. PATENT DOCUMENTS

| | | | |
|---|---|---|---|
| 601,534 | 3/1898 | Straka | 452/123 |
| 691,505 | 1/1902 | Turner | 452/123 |
| 744,712 | 11/1903 | Bitterling | 452/123 |
| 1,077,488 | 11/1913 | Olsen | 452/123 |
| 1,826,526 | 10/1931 | Ross et al. | 452/123 |
| 2,244,179 | 6/1941 | Stridh | 452/123 |
| 3,649,163 | 3/1972 | McCusker | 8/94.11 |
| 3,882,571 | 5/1975 | Evers et al. | 452/123 |
| 3,918,124 | 11/1975 | Evers et al. | 452/123 |
| 3,949,447 | 4/1976 | Evers et al. | 452/123 |
| 4,063,331 | 12/1977 | O'Neal et al. | 452/123 |

Primary Examiner—Willis Little
Attorney, Agent, or Firm—Charles F. Costello, Jr.

[57] ABSTRACT

A machine for separating serosa from mucosa is disclosed. The machine comprises two peeling rollers, or one peeling roller or belt and a stationary member. The stationary member can comprise a blade. The separation between the two peeling rollers, or the one peeling roller or belt and stationary member is about equal to or less than the thickness of a harvested intestine ribbon. The separation has a proximal and a distal end. The machine also comprises first means for rotating the one or more peeling rollers or the peeling belt at a first speed. A pull roller is adjacent to the distal end of the separation. The machine further comprises second means for rotating the pull roller at a second speed. The second speed is less than the first speed of the first means for rotating. The source of the nonseparated serosa-mucosa layer can be a harvested intestine ribbon of a mammal. Separated serosa is useful in the manufacture of catgut sutures.

11 Claims, 6 Drawing Sheets

0
SEROSA PEELING MACHINE

BACKGROUND AND SUMMARY OF THE INVENTION

This invention relates to a machine for separating serosa from mucosa of a mammal. The serosa is then used to manufacture catgut sutures.

The peeling machine is configured to satisfactorily peel either a single split strand or two double split strands as they come out of the harvester. As used in this application, the terms "harvester" and "harvesting machine" have the identical meaning and are therefore interchangeable. Similarly, the terms "peeler" and "peeling machine" have the identical meaning, and unless otherwise specified refer to the peeling machine claimed in this application. The term "harvesting and peeling machines" as used in this application means a prior art harvesting machine (or harvester) and the peeling machine (or peeler) of this invention. The peeling action is stable and the occurrence of strand breakage and wrap up on the peeling mechanism is virtually eliminated. In fact, the peeling machine performs with far less difficulties than the harvester.

In U.S. Pat. No. 2,595,638 which issued about or before 1948 to A. Costelow and is entitled "Improved Method For Separating Membranes of Animal Intestines", two devices are disclosed. This patent corresponds to Australian patent 135,798 which was granted in 1948. Both patents are incorporated herein by reference. In both of these patents, one of the devices is used for beating the intestine before it is peeled and split in the second device. The order in which the individual steps are conducted differ from that shown in FIG. 1 of this invention. In U.S. Pat. No. 2,595,638 the intestine is beaten, peeled and then the harvested serosa is split thus leaving the mucosal layer intact and viable for the use in sausage skins. Furthermore, the peeling and splitting processes are conducted by an operator manually pulling the intestine over two steel balls and past a number of splitting blades.

The invention is disclosed in the following embodiments:

1. A machine for separating serosa from mucosa comprising two axially aligned and synchronized peeling rollers, each of the two peeling rollers having an external surface, and the separation between the two peeling rollers being about equal to or less than the thickness of a harvested intestine ribbon, said separation having a proximal and a distal end; first means for rotating said two peeling rollers at a first speed; a pull roller adjacent to the distal end of said separation; and second means for rotating the pull roller at a second speed.

2. A machine for separating serosa from mucosa comprising a stationary member; a peeling roller axially aligned with the stationary member, the peeling roller having an external surface, and the separation between the peeling roller and said stationary member being about equal to or less than the thickness of a harvested intestine ribbon, said separation having a proximal and a distal end; first means for rotating said peeling roller at a first speed; a pull roller adjacent to the distal end of said separation; and second means for rotating the pull roller at a second speed.

3. A machine for separating serosa from mucosa comprising a stationary member; a peeling belt axially aligned with the stationary member, the peeling belt having an external surface, and the separation between the peeling belt and said stationary member being about equal to or less than the thickness of a harvested intestine ribbon, said separation having a proximal and a distal end; first means for rotating said peeling belt at a first speed; a pull roller adjacent to the distal end of said separation; and second means for rotating the pull roller at a second speed.

4. The machine of embodiment 1 wherein each of said external surfaces are serrate like.

5. The machine of embodiment 2 or 3 wherein the external surface is serrate like.

6. The machine of embodiment 1 wherein each of said external surfaces has a durometer hardness from about 20 to 100.

7. The machine of embodiment 2 or 3 wherein the external surface has a durometer hardness from about 20 to 100.

8. The machine of embodiment 2 or 3 wherein said stationary member comprises a blade.

9. The machine of embodiment 1 to 4 or 6 wherein said separation is about 0.001 to 0.020 inches.

10. The machine of embodiment 1 to 4 or 6 wherein the harvested intestine ribbon is at least one split strand.

11. The machine of embodiment 10 wherein said harvested intestine ribbon is a single split strand.

12. The machine of embodiment 10 wherein said harvested intestine ribbon is two split strands.

13. The machine of embodiment 1 to 4 or 6 wherein the first speed is about 50 to 1000 rpm.

14. The machine of embodiment 13 from wherein said first speed is about 100 to 300 rpm.

15. The machine of embodiment 13 wherein the second speed is less than about 50 to 1000 rpm.

16. The machine of embodiment 15 wherein said second speed is less than about 100 to 300 rpm.

17. A machine comprising automated means for separating serosa from mucosa.

18. The machine of embodiment 17 comprising two axially aligned and synchronized peeling rollers, each of the two peeling rollers having an external surface, and the separation between the two peeling rollers being about equal to or less than the thickness of a harvested intestine ribbon, said separation having a proximal and a distal end; first means for rotating said two peeling rollers at a first speed; a pull roller adjacent to the distal end of said separation; and second means for rotating the pull roller at a second speed, the second speed being less than the first speed of the first means for rotating.

19. The machine of embodiment 17 comprising a stationary member; a peeling roller axially aligned with the stationary member, the peeling roller having an external surface, and the separation between the peeling roller and said stationary member being about equal to or less than the thickness of a harvested intestine ribbon, said separation having a proximal and a distal end; first means for rotating said peeling roller at a first speed; a pull roller adjacent to the distal end of said separation; and second means for rotating the pull roller at a second speed, the second speed being less than the first speed of the first means for rotating.

20. The machine of embodiment 17 comprising a stationary member; a peeling belt axially aligned with the stationary member, the peeling belt having an external surface, and the separation between the peeling belt and said stationary member being about equal to or less than the thickness of a harvested intestine ribbon, said separation having a proximal and a distal end; first means for rotating said peeling belt at a first speed; a pull roller adjacent to the distal end of said separation; and second means for rotating the pull roller at a second speed, the second speed being less than the first speed of the first means for rotating.

DESCRIPTION OF THE INVENTION

The peeling machine is configured to satisfactorily peel either a single split strand or two double split strands as they come out of the harvester. As used in this application, the terms "harvester" and "harvesting machine" have the identical meaning and are therefore interchangeable. Similarly, the terms "peeler" and "peeling machine" have the identical meaning, and unless otherwise specified refer to the peeling machine claimed in this application. The term "harvesting and peeling machines" as used in this application means a prior art harvesting machine (or harvester) and the peeling machine (or peeler) of this invention. The peeling action is stable and the occurrence of strand breakage and wrap up on the peeling mechanism is virtually eliminated. In fact, the peeling machine performs with far less difficulties than the harvester.

Figure 1:
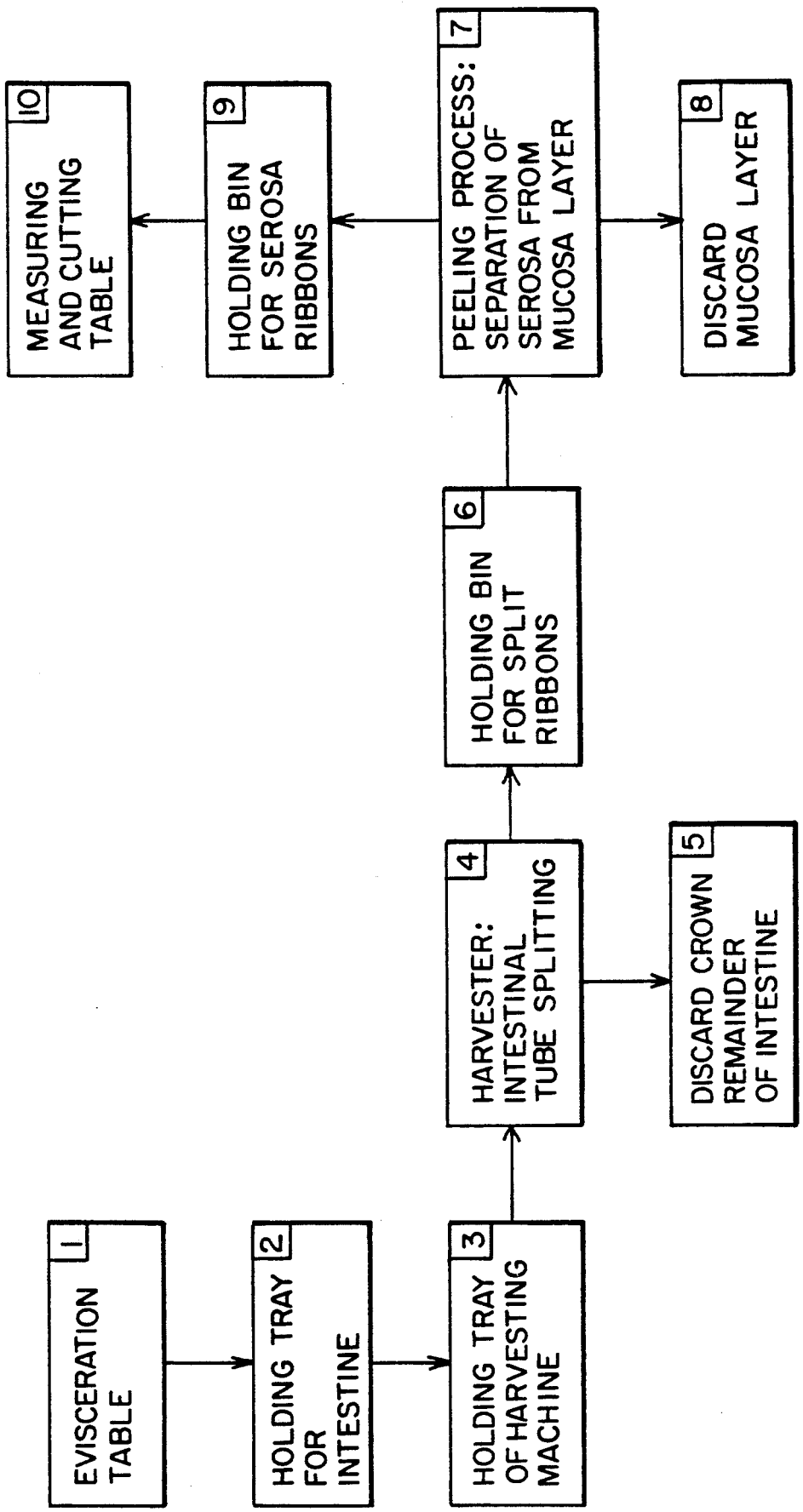
FIG. 1 is a block diagram showing the steps for preparing serosa ribbons.

FIG. 1 describes the overall harvesting and peeling process of mammalian intestine for the use in tennis strings, surgical sutures and the like. The whole intestine is gleaned from the animal at the evisceration table 1 and then passed to a holding tray 2 to await harvesting of the serosa ribbon. The intestine is pulled onto the harvesting machine holding tray 3 where the start of the small intestine is cut from the large intestine. The small intestine is then passed through the harvesting machine 4 where it is split and the unwanted portion is discarded 5. E.g., see U.S. Pat. No. 3,949,447 which issued in 1974 to R. Evers and D. Perrett and is entitled "Separation of Animal Intestines", and is incorporated herein by reference.

The wanted split portion, one or more ribbons, are also beaten by the harvesting machine 4. Beating partially ruptures the fibers between the mucosal and serosal layers. The beaten split ribbon is then passed into a holding bin 6 where it is stored momentarily till it is peeled 7. The peeling process 7 involves, by whatever means, separating the wanted serosal layer from the mucosal layer. The mucosa is discarded 8 while the serosa is placed in a holding bin 9 until it is gathered, cut to suitable lengths 10 and then packaged ready for storage and shipping.

Figure 2:
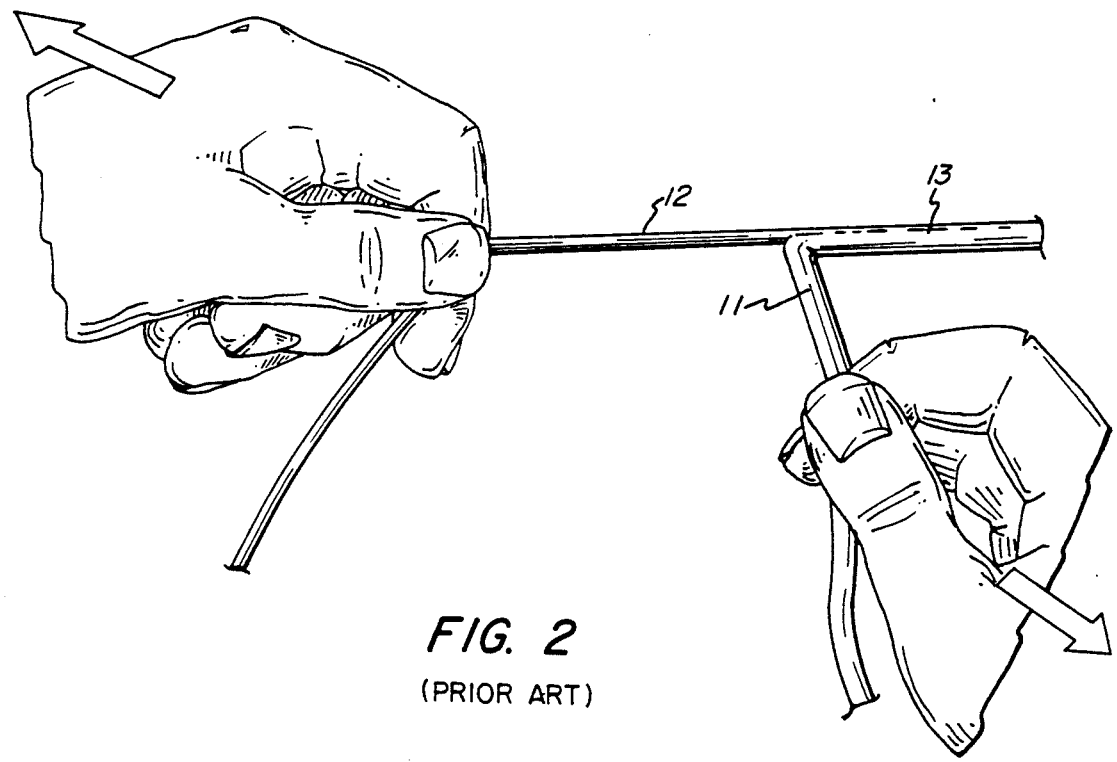
FIGS. 2 and 3 show prior art manual means for separating serosa from mucosa.
Figure 3:
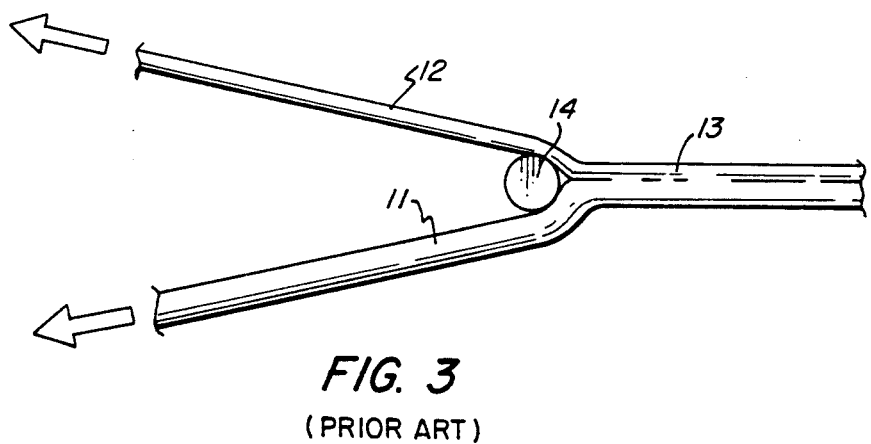

Previously, the peeling process 7 required manually pulling the mucosal 11 layer from the serosal layer 12 (FIG. 2). This method was later improved upon by pulling the split ribbon 13 around a steel pin 14 (FIG. 3). Nevertheless, both these peeling processes were labor intensive and required one worker dedicated to peeling.

In U.S. Pat. No. 2,595,638 which issued about or before 1948 to A. Costelow and is entitled "Improved Method For Separating Membranes of Animal Intestines", two devices are disclosed. This patent corresponds to Australian patent 135,798 which was granted in 1948. Both patents are incorporated herein by reference. In both of these patents, one of the devices is used for beating the intestine before it is peeled and split in the second device. The order in which the individual steps are conducted differ from that shown in FIG. 1 of this invention. In U.S. Pat. No. 2,595,638 the intestine is beaten, peeled and then the harvested serosa is split thus leaving the mucosal layer intact and viable for the use in sausage skins. Furthermore, the peeling and splitting processes are conducted by an operator manually pulling the intestine over two steel balls and past a number of splitting blades.

Figure 4:
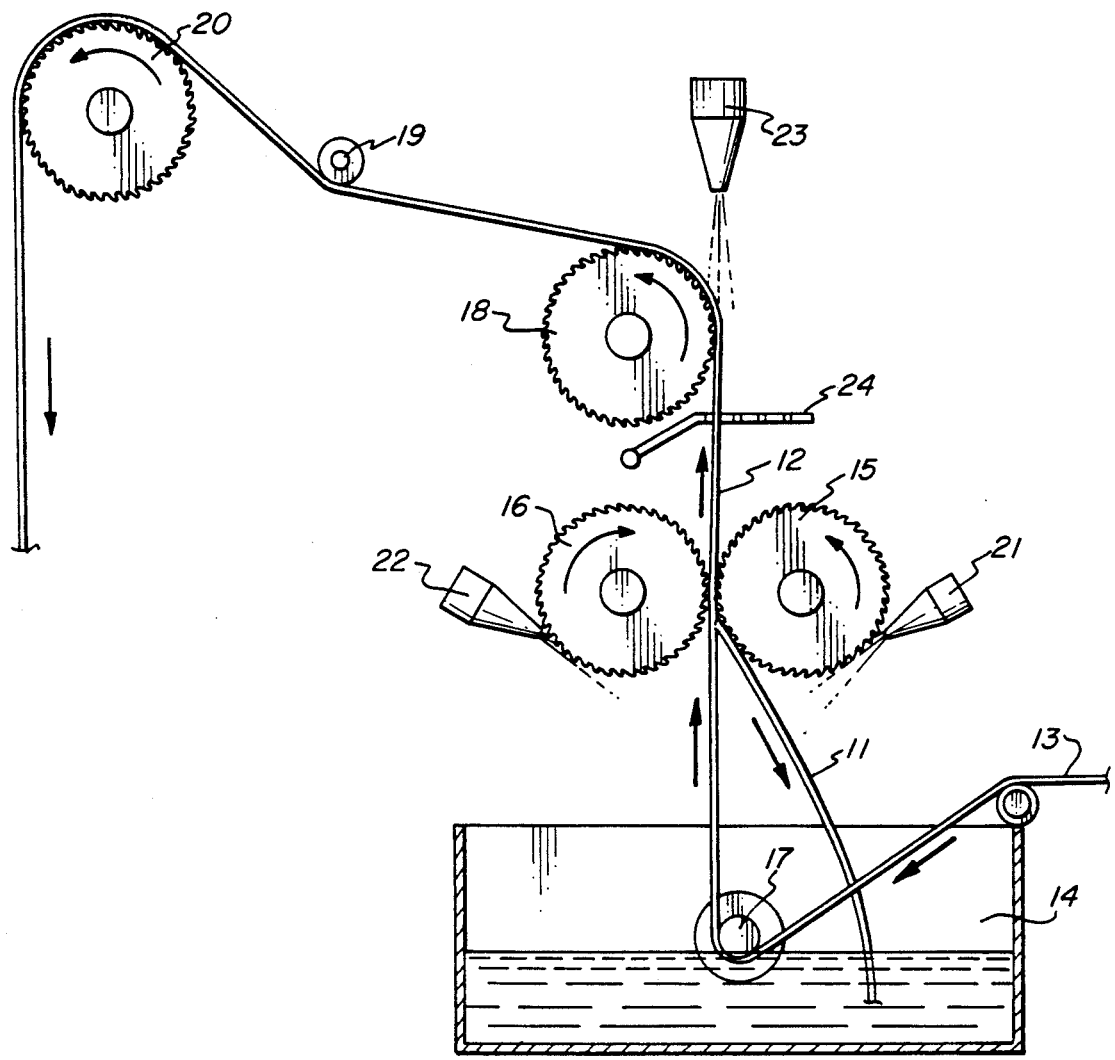
FIGS. 4, 4a and 4b show alternative embodiments of the peeling machine of this invention.
Figure 4A:
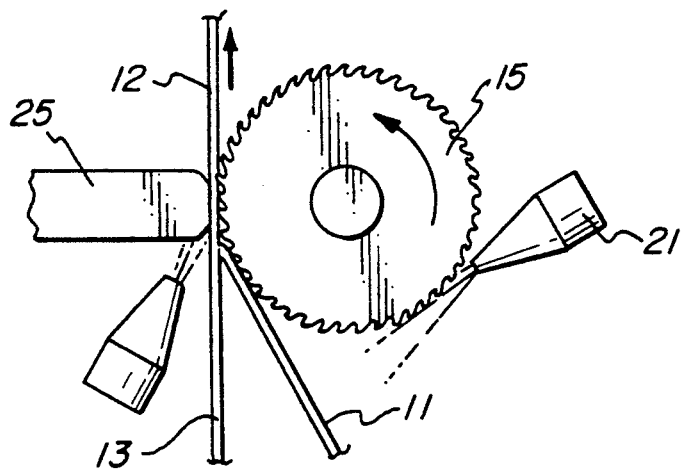
Figure 4B:
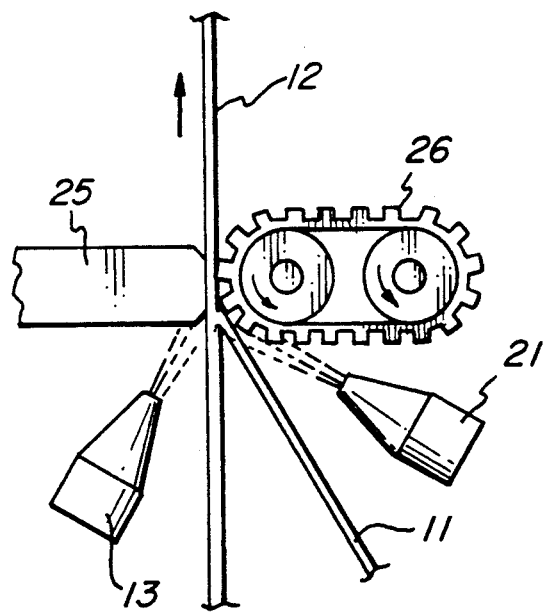

The peeling machine described in FIGS. 4, 4a and 4b is a device designed to fully automate the peeling process. Regardless of the mechanism, the basic principle of this machine is to pull the mucosal layers from the serosa to provide a suitable input material for the manufacture of tennis string, surgical sutures and the like. This task could be accomplished by many different machine set at a number of parameters, however, one possible configuration is shown in FIG. 4. The incoming split ribbon 13 passes into the waste collection bin 14 until it is vertically under the peeling rollers 15 and 16. It then runs around a bar 17 or similar, up and between the two counter rotating peeling rollers 15 and 16 where the actual peeling task is accomplished. At this point the unwanted mucosal layers 11 fall back into the waste collection bin 14.

The serosa 12 passes from the peeling rolls 15 and 16 over the pull roller 18 under an arc of contact adjustment bat 19, around the takeoff 20 and into a collection bin. The water jets 21 and 22 are provided to moisten the incoming split ribbon 13 and clean the peeling rollers 15 and 16. In addition, these water jets 21 and 22 are placed tangentially to and apposing the surface motion of the lower area of the peeling rollers 15 and 16. This positioning reduces the occurrence of the unwanted mucosa from becoming entangled around the peeling rollers 15 and 16. The entanglement is often termed "wrap up".

A third water jet 23 is placed vertically above the peeling rollers 15 and 16 and is used to moisten and wash the peeled serosa 12. This water jet 23 also reduces the occurrence of the mucosal layers 11 from passing through the peeling rollers 15 and 16 and becoming incorporated in the serosa 12. The guide bar 24 is designed to aid the positioning of the split ribbon 13 between the peeling rollers 15 and 16 and allows more than one split ribbon 13 to be peeled on one set of peeling rollers 15 and 16.

The peeling rollers 15 and 16 rotate in the opposite direction to the motion of the serosa 12 as it passes through the machine. As done by the surface of the peeling rollers 15 and 16, the peeling task is known to vary with respect to the gap between the roller surface and the hardness of the peeling surface. The peeling roller gap can be infinitely adjusted from 0.000" to greater than 0.015" with 0.005" to 0.009" being preferred for a peeling surface hardness of 60 to 80 durometer (Shore Durometer Type A, Shore Instrument and Manufacturing Corp. Inc., NY USA).

As stated above the peeling task can be accomplished by a number of mechanisms with a number of different parameters. For instance, the second peeling roller 16 could be replaced by a static blade 25 as shown in FIG. 4a. In another variant the peeling rollers 15 and/or 16 could be quite easily imitated, for example by a pliable ribbed belt 26 (FIG. 4b), scourer, brush or the like, which run around pulleys or the like. Furthermore, the equivalent hardness of the peeling surface is a combination of the surface profile and the hardness of the material which is used to produce the surface. Hence a hard material with a thinner rib profile could be used with a larger peeling surface gap setting.

It is also known that the overall and relative speed of the peeler affects the operation of the machine. A number of possible operating conditions are shown in Table 1. The selection of the five operating speed levels for the peeling 15 and 16 and pull rollers 18 are empirical. The roller gap setting used in Table 1 was 0.009".

The operable combinations of peeler/pull rollers speeds are disclosed in Table 1 as numbers 1 to 3 and 5 to 8. These numbers correspond to test conditions. The observations from the separation trials using these test conditions are also disclosed. Number 4 in Table 1 is a contrastive test condition.

TABLE 1

| PULL ROLLER SPEED SETTINGS (RPM) | OPERATING CONDITIONS PEELER ROLLER SPEED SETTINGS (RPM) | | | |
|---|---|---|---|---|
| | 160-170 | 200-210 | 240-250 | 280-290 |
| 120-130 | | 1 | | |
| 160-170 | | 2 | 7,8 | |
| 200-210 | 4 | 3 | 5 | 6 |

NOTES:
1. NUMBERS IN PULL/PEELER ROLLER SPEED COMBINATIONS OF TABLE INDICATE THE ORDER IN WHICH TRIALS WERE PERFORMED.
2. THE PEELER ROLLER GAP SETTING WAS 0.009".

A brief summary of the operating conditions follows:

| Test condition 1. | |
|---|---|
| Peeler roller speed | 200-210 rpm. |
| Pull roller speed | 120-130 rpm. |
| Observation: Stable peeling conditions with no difficulties. | |
| Test condition 2. | |
| Peeler roller speed | 200-210 rpm. |
| Pull roller speed | 160-170 rpm. |
| Observation: Stable peeling conditions with no difficulties. | |
| Test condition 3. | |
| Peeler roller speed | 200-210 rpm. |
| Pull roller speed | 200-210 rpm. |
| Observation: Increased tendency for mucosa to adhere to peeling rollers. | |
| Contrastive test condition 4. | |
| Peeler roller speed | 160-170 rpm. |
| Pull roller speed | 200-210 rpm. |
| Observation: Increasing pull roller speed above peeling roller speed caused the mucosa to adhere more frequently to the peeling roller with eventual wrap up on the peeling roller. | |
| Test condition 5. | |
| Peeler roller speed | 240-260 rpm. |
| Pull roller speed | 200-210 rpm. |
| Observation: Increasing the peeling roller speed above the pull roller speed resulted in a return to stable peeling conditions with no difficulties. The peeling machine was now faster than the harvester. | |
| Test condition 6. | |
| Peeler roller speed | 280-290 rpm. |
| Pull roller speed | 200-210 rpm. |
| Observation: Fast, stable peeling conditions were | |

-continued

| maintained with no difficulties. However, the peeling machine was too fast for the harvester. | |
|---|---|
| Test conditions 7 and 8. | |
| Peeler roller speed | 240-250 rpm. |
| Pull roller speed | 160-170 rpm. |
| Observation: Stable peeling conditions were maintained with no difficulties. This peeling speed was faster than the harvester but did not appear to pose problems. | |

From the above conditions and observations, the strand pull through speed produced by the pull rollers rotating at 160 to 170 rpm adequately matches the harvester output supply speed of unpeeled strand. It is desirable to have a slightly faster peeling machine speed (about 10 to 20 percent) than the harvester supply speed. This gives the peeling machine the capability of catching up on the harvester, if this is required.

The peeling roller speed in relation to the "pull roller speed is shown in Table 1. A peeler roller speed of 240 to 250 rpm produced stable peeling conditions when the pull rollers had a speed of 160 to 170 rpm. As used herein, the term "pull roller speed" is in RPM (revolutions per minute) and is a roller speed. The term "pull through speed" is the speed of the serosa, e.g. in m/sec. and is the product of the pull roller speed, pull roller diameter, and slippage.

The slippage of the serosa is a function of the combined roller speeds, the angle of contact of the serosa around the pull 18 and takeoff 20 rollers and the drag on the incoming split ribbon 13. The serosa is pulled through the machine by the friction between the serosa 12 and the pull and takeoff rollers. The amount of pulling friction can be increased by lowering the arc of contact of adjustment bar 19 (FIG. 4) and thus increasing the area of contact between the two rollers and the serosa. The arc of contact of adjustment bar 19 is set so that unloaded serosa pulls evenly and quickly through the peeler but will slip without breakage should the incoming serosa become loaded or jammed. Also, the peeling pull through speed is limited by the harvester speed once the peeler has caught up.

To assess the suitability of combining the automated harvesting and peeling processes an assessment was made on the division of an operator's time between a harvester and a peeling machine with the operating speeds specified by conditions 7 and 8 in Table 1, above. Referring to Table 2A, four activity elements were selected for the operator and time. Element 3 is heavily dependent on the size of the crown set being processed (that is, the length of the strand). Its largest component being either the strand splitting or peeling time for the machines. These times are given in Table 2B.

TABLE 2 A

| OPERATOR ACTIVITY TIMES | | |
|---|---|---|
| ELEMENT NUMBER | OPERATOR ACTIVITY DESCRIPTION | TIME |
| 1 | SELECT INTESTINE FROM HOLDING TRAY LIFT TO HARVESTER TRAY AND ADJUST POSITION FOR SPLITTING PREPARE START END AND POSITION ON HORN - SPLITTING COMMENCES LAY SPLIT END OVER TAKE OFF ROLLER AND PLACE ON EDGE OF TRAY | 14 TO 29 SECONDS |
| 2 | MOVE FROM HARVESTER TO PEELING MACHINE | 10 TO |

TABLE 2 A-continued

OPERATOR ACTIVITY TIMES

| ELEMENT NUMBER | OPERATOR ACTIVITY DESCRIPTION | TIME |
|---|---|---|
| | CLEAR AWAY MUCOSA FROM PREVIOUS STRAND AND DISPOSE IN DRUM | 14 SECONDS |
| | PICK UP END OF UNPEELED STRAND FROM HARVESTER TRAY EDGE | |
| | THREAD THROUGH GUIDE AND SEPARATE MUCOSA/SEROSA LAYERS | |
| | THREAD SEROSA LAYER THROUGH PEELING AND PULL ROLLERS | |
| | LAY PEELED END OF STRAND ON TRAY EDGE | |
| 3 | MOVE BACK TO HARVESTER AND SUPERVISE OPERATION OF MACHINES | SEE NOTE |
| 4 | REMOVE SPLIT INTESTINE FROM HARVESTER TRAY AND DISPOSE | 5 SECONDS |

NOTE: TIME FOR ELEMENT 3 DEPENDS UPON STRAND LENGTH SEE TIMES FOR HARVESTER AND PEELING MACHINE

TABLE 2 B

STRAND SPLITTING AND PEELING TIMES

| | STRAND NUMBER/TIME | | | |
|---|---|---|---|---|
| ELEMENT DESCRIPTION | 1 | 2 | 3 | 4 |
| TIME FROM COMMENCEMENT OF SPLITTING TO END OF STRAND FALLING INTO TRAY | 53 SECS | 38 SECS | 42 SECS | 33 SECS |
| TIME FROM COMMENCEMENT OF PEELING TO END OF STRAND FALLING INTO TRAY | 53 SECS | 42 SECS | 53 SECS | 31 SECS |

NOTE:
WHILE THE PULL ROLLER SET SPEED WAS 160-170 RPM THE TORQUE OF THE MOTOR WAS LOW AT THIS SPEED SETTING AND THE SPEED OF THE PULL ROLLERS OF THE PEELING MACHINE DROPPED TO 120-130 RPM UNDER THE PEELING LOADS REQUIRED FOR THESE TRIALS.
THUS THE PEELING TIMES WOULD BE REDUCED BY A FACTOR OF APPROXIMATELY 0.76 TO GIVE THE PEELING TIME FOR A PULL SPEED OF 160-170 RPM.

As shown in Table 2B, it should be noted here that the pull roller shaft speed reduced under the peeling load during the time study to 120 to 130 rpm (this was due to the low torque capability of the pull roller motor at the set speed of 160 to 170 rpm). Hence the peeling machine times would be expected to be reduced by a factor of approximately 0.76 if the peeling machine was running at 160 to 170 rpm.

Figure 5:
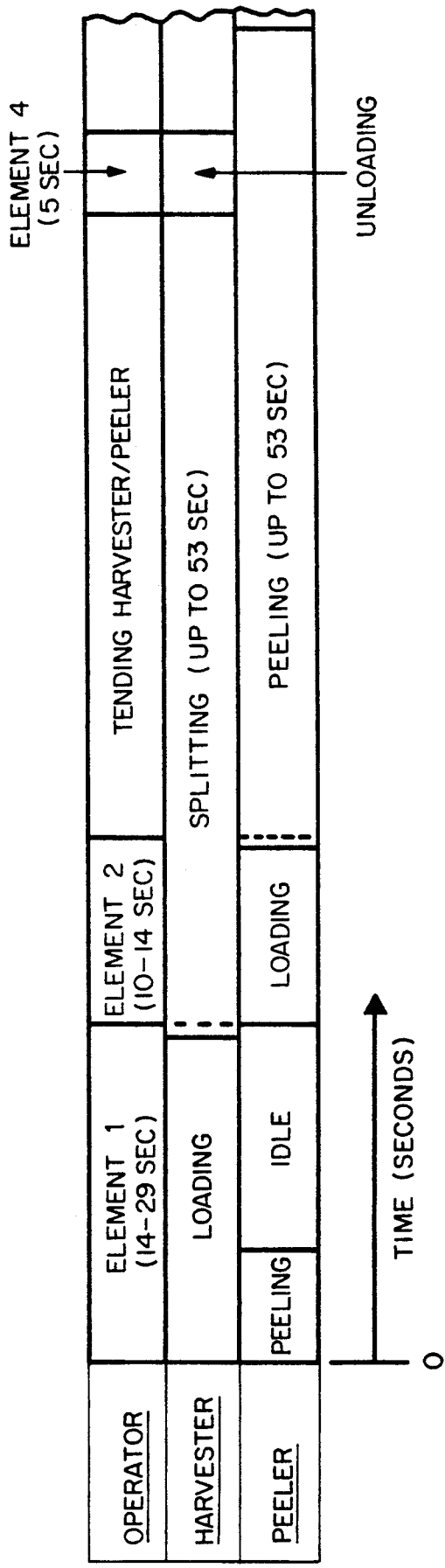
FIG. 5 shows a timed activity chart for an operator using the embodiment of FIG. 4.

An activity chart for the harvesting and peeling machines is graphically shown in FIG. 5. FIG. 5 was assembled from the times collected for the elements in Table 2. From this it can be seen that when the harvester is fully utilized, the peeling machine has an idle period and the operator has a low activity period for tending the harvester and peeling machines. Hence, as shown in Tables 1 and 2, and the activity chart of FIG. 5, the introduction of the peeling machine into the operators work cycle does not appear to increase the cycle time for the splitting operation on the harvester.

The following examples show the catgut strand manufactured from the peeling machine of this invention to be as good as, if not superior to a prior art catgut strand.

EXAMPLE 1

Histological Examination of Peeled Serosa

Peeled serosa in this example is the input material for the making of catgut sutures. Hence it is important that the peeling machine does not adversely affect the serosa. In this example samples of serosa peeled by the peeling machine were embedded, sectioned, mounted and stained for histological examination. These samples were quantitatively compared to a matching number of control samples produced by a prior art peeling method. The results of this study are summarised in Table 3.

TABLE 3

| Proportion of muscle contained in control and automatically peeled serosa | | |
|---|---|---|
| | Proportion of Muscle (%) | |
| Average of Ten Samples | Auto Peeled | Control |
| | 54 ± 13 | 49 ± 13 |

The control and automatically peeled serosa appeared to be approximately half collagen and half muscle. Any variation between the automatically peeled and control samples (54±13% cf. 49±13%) was marginal ($P=0.07$) and there was no notable variation in morphology.

EXAMPLE 2

Physical Testing of Finished Sutures

Four batches of sutures were produced during the peeling machine operating trials. Sutures produced from the serosa peeled during the trials was physically characterized by standard in vitro tests. The average results of the finished sutures manufactured by the peeling machine of this invention ("Auto" for automatic) are compared to those of a prior art catgut suture ("control"). Specific comments on each of the tests is as follows:

Appearance

Appearances were tested after 1 and 2 weeks of storage in suture packaging fluid (See Table 4). At both 1 and 2 weeks the appearance of the control and automatically peeled sutures was the same ($P>=0.5$). The overall appearance of all the sutures was in the order of 3.5 out of 10; 10 being the worst and 1 being the best.

Fray

Fray was assessed by use of an industry known fraybond tester and the results are summarized in Table 4. There was no variation in the average number of frays ($P>0.35$) measured. In contrast, there was a significant ($P<0.001$) increase in the probability of fray from 0.4±0.5 to 0.6±0.5, however, this difference is well within normal intra-material variation. This variation in fray results was further investigated using the Kruskal-Wallis nonparametric test which showed that the peeling method produced less variation ($0.002<P<0.01$) compared to an intra-material comparison ($P<0.0005$).

There was no significant ($P=0.12$) variation in the amount of debonding seen in either the control or automatically peeled group. The average debonding was 1.2 mm for the control group and 0.5 mm for the automatically peeled group.

TABLE 4

| Fray test and appearance results for size 1 chromic sutures | | | | |
|---|---|---|---|---|
| | Prob. of | Average | Bond Length | Appearance |
| Exp. | Fray | Fray | (mm) | 1 Week | 2 Week |
| Control | 0.4 ± 0.5 | 2.0 ± 3.5 | 1.2 ± 4.7 | 3.5 ± 2.2 | 3.3 ± 2.2 |

TABLE 4-continued

Fray test and appearance results for size 1 chromic sutures

| Exp. | Prob. of Fray | Average Fray | Bond Length (mm) | Appearance 1 Week | Appearance 2 Week |
|---|---|---|---|---|---|
| Automatic | 0.6 ± 0.4 | 1.7 ± 1.9 | 0.5 ± 3.1 | 3.5 ± 2.1 | 3.5 ± 2.1 |

Diameter and Strength

With the exception of one subgroup of size 4/0, all test groups were comprised of sutures which met USP finished suture specifications for diameter. The 4/0 size group was on average 0.001 mm over specification.

In general there was no variation (P>0.21) in straight pull and knot pull strengths. The exceptions were the 3/0 straight pull and 4/0 knot pull strength. Size 3/0 control material was stronger in straight pull (3.03±0.48 cf. 2.75±0.48) while the size 4/0 control was weaker (0.96±0.13 cf. 1.01±0.12). The data is summarized in Table 5.

TABLE 5

Diameter and strength results for size 1, 0, 3/0 and 4/0 chroimic sutures

| Exp. | Swollen Dia (mm) | Knot Pull (kg) | Straight Pull (kg) |
|---|---|---|---|
| Size 1 | | | |
| Control | 0.586 ± 0.003 | 4.84 ± 0.40 | 8.88 ± 0.68 |
| Automatic | 0.586 ± 0.003 | 4.98 ± 0.40 | 8.79 ± 0.85 |
| Size 0 | | | |
| Control | 0.492 ± 0.003 | 3.62 ± 0.27 | 6.38 ± 0.55 |
| Automatic | 0.492 ± 0.003 | 3.68 ± 0.36 | 6.45 ± 0.64 |
| Size 3/0 | | | |
| Control | 0.338 ± 0.003 | 1.83 ± 0.17 | 3.03 ± 0.48 |
| Automatic | 0.338 ± 0.003 | 1.83 ± 0.22 | 2.75 ± 0.48 |
| Size 4/0 | | | |
| Control | 0.245 ± 0.003 | 0.96 ± 0.13 | 1.62 ± 0.28 |
| Automatic | 0.245 ± 0.004 | 1.01 ± 0.12 | 1.59 ± 0.28 |

Flexibility, Shrink Temperature and Knot Security

The results of the flexibility, shrink temperature and know security tests are summarized in Table 6. There was no variation (P>0.12) in either flexibility or shrink temperature for either size 1 or 4/0 sutures.

Knot security for size 4/0 material did not differ significantly (P=0.88) while a marginal variation (P=0.02) was observed for size 1.

TABLE 6

Flexibility, knot security and shrink temperature results for size 1 and 4/0 chromic sutures

| Size | Flexibility (Nm) | Knot Security (min) | Shrink Temp. (deg °C.) |
|---|---|---|---|
| Size 1 | | | |
| Control | 1029 ± 106 | 6.7 ± 1.6 | 77.2 ± 0.8 |
| Automatic | 1031 ± 126 | 5.9 ± 1.4 | 77.3 ± 0.6 |
| Size 4/0 | | | |
| Control | 70.8 ± 15.8 | 26.4 ± 9.6 | 77.1 ± 1.3 |
| Automatic | 74.6 ± 21.3 | 26.5 ± 9.4 | 77.1 ± 1.0 |

EXAMPLE 3

In Vivo Tissue Reaction of Finished Sutures

In vivo tissue reaction studies were conducted on the suture sizes 1 and 4/0 of Example 2.

Figure 6:
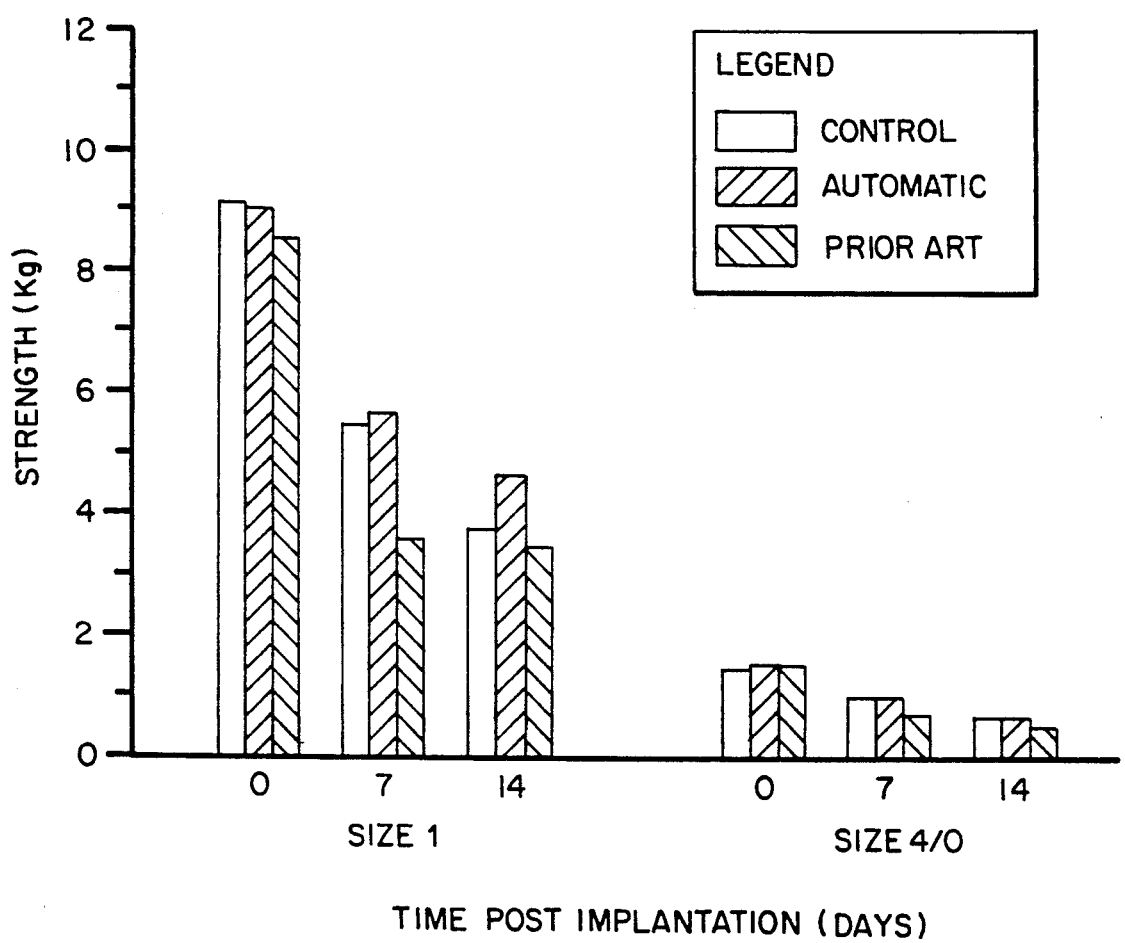
FIG. 6 is a graph contrasting the tensile strength of a catgut suture manufactured from serosa peeled by the machine of this invention with a prior art catgut suture.

The tissue reaction results are summarized in Table 7 while FIG. 6 contains a summary of the in vivo tensile strength. For comparison, Table 7 and also FIG. 6 contain in vivo data on a prior art commercial chromic catgut suture (Ethicon, Inc., NJ U.S.A.).

TABLE 7

In vivo tissue reaction results at 7 and 14 days post implantation

| | Incidents of Abscess | | | |
|---|---|---|---|---|
| | Size 4/OH | | Size 1H | |
| Material/ Experiment | 7 Days | 14 Days | 7 Days | 14 Days |
| Prior Art | 0/10 | 2/10 | 0/10 | 0/10 |
| Control | 0/10 | 0/10 | 1/10 | 1/10 |
| Automatic | 0/10 | 1/10 | 1/10 | 2/10 |

Tissue Reaction

Generally tissue reaction results were low with no more than 1 or 2 incidents of abscess being reported at 7 and 14 days, respectively. The results for the control and automatic results were combined and statistically analyzed by a nonparametric method: Kruskal-Wallis. The analysis indicated that there was no significant variation between the results of the prior art commercial, control and automatic suture groups (P>0.15).

In vivo Strength

The in vivo strengths of both 4/0 and 1 sutures were statistically analyzed using the Student t-test. Results show that there was no significant variation in strength between the control and automatically peeled suture groups at either 7 or 14 days post implantation (P >0.84 size 4/0 and P>0.1 size 1).

As shown in FIG. 6, the in vivo strength of the prior art commercial suture tended to be lower. Furthermore, these sutures tended to rapidly lose strength from day 0 to 7 then remain relatively constant from day 7 to 14. The sutures manufactured by the machine described in this application exhibited a more consistent loss of strength over time.

EXAMPLE 4

Peeling Machine

The peeling machine used in examples 1 to 3 used a peeling mechanism surface hardness of 80 durometer (Shore Durometer Type A, Shore Instrument and Manufacturing Corp. Inc., NY USA) with a gap setting of 0.009". However, the hardness and corresponding peeling roller gap settings can be altered and still produce a suitable material.

In this example, a peeling machine set with similar settings to that used in examples 1-3 is compared to a machine with a softer 60 durometer peeling surface. The 60 durometer peeling surface was set with a gap of 0.008" and then 0.005".

As summarized in Table 8, by using a softer peeling surface (60 durometer, 0.008") there is a minor decrease in straight pull strength (1.7 kg cf. 2.0 kg) with an improvement in fray and appearance (the smaller the rating, the better the appearance). By decreasing the gap setting for the softer peeling surface the straight pull strength is returned to 2.0 kg without loss of appearance or fray quality.

TABLE 8

Knot and straight pull, fray and appearance results for size 4/0 chromic sutures produced with different peeling machine settings.

| Test | 0.008" 80 Duro Roller | 0.008" 60 Duro Roller | 0.005" 60 Duro Roller |
| --- | --- | --- | --- |
| Knot Pull (kg) | 1.0 ± 0.1 | 1.1 ± 0.1 | 1.1 ± 0.1 |
| Straight Pull (kg) | 2.0 ± 0.3 | 1.7 ± 0.2 | 2.0 ± 0.3 |
| Probability of Fray | 0.3 ± 0.5 | 0.1 ± 0.3 | 0.1 ± 0.3 |
| Average Fray | 0.4 ± 0.7 | 0.1 ± 0.3 | 0.3 ± 1.1 |
| Appearance | 5.3 ± 2.0 | 2.3 ± 0.6 | 2.4 ± 1.1 |

We claim:

1. A machine for separating serosa from mucosa comprising two axially aligned and synchronized peeling rollers, each of the two peeling rollers having an external surface and each of the external surfaces having a Shore A durometer hardness from about 20 to 100, and the separation between the two peeling rollers being about equal to or less than the thickness of a harvested intestine ribbon, said separation having a proximal and a distal end; first means for rotating said two peeling rollers at a first speed; a pull roller adjacent to the distal end of said separation; and second means for rotating the pull roller at a second speed.

2. The machine of claim 1 wherein each of said external surfaces are serrate like.

3. The machine of claim 2 or 1 wherein said separation is about 0.001 to 0.020 inches.

4. The machine of claim 2 or 1 wherein the harvested intestine ribbon is at least one split strand.

5. The machine of claim 4 wherein said harvested intestine ribbon is a single split strand.

6. The machine of claim 4 wherein said harvested intestine ribbon is at least two split strands.

7. The machine of claim 2 or 1 wherein the first speed is about 50 to 1000 rpm.

8. The machine of claim 7 from wherein said first speed is about 100 to 300 rpm.

9. The machine of claim 7 wherein the second speed is less than about 50 to 1000 rpm.

10. The machine of claim 9 wherein said second speed is less than about 100 to 300 rpm.

11. A machine for separating serosa from mucosa comprising a stationary member; a peeling roller axially aligned with the stationary member, the peeling roller having an external surface wherein the external surface has a Shore A durometer hardness from about 20 to 100, and the separation between the peeling roller and said stationary member being about equal to or less than the thickness of a harvested intestine ribbon, said separation having a proximal and a distal end; first means for rotating said peeling roller at a first speed; an pull roller adjacent to the distal end of said separation; and second means for rotating the pull roller at a second speed.

* * * * *